(12) United States Patent
Lee et al.

(10) Patent No.: US 9,405,103 B2
(45) Date of Patent: Aug. 2, 2016

(54) PHOTOGRAPHIC LENS OPTICAL SYSTEM (71) Applicant: KOLEN CO., LTD., Seongnam-si (KR)

(72) Inventors: Jong Jin Lee, Seoul (KR); Chan Goo Kang, Seongnam-si (KR)

(73) Assignee: KOLEN CO., LTD., Seongnam-si (KR)

( * ) Notice: Subject to any disclaimer, the term of this patent is extended or adjusted under 35 U.S.C. 154(b) by 0 days.

(21) Appl. No.: 14/823,602

(22) Filed: Aug. 11, 2015

(65) Prior Publication Data

US 2016/0041371 A1   Feb. 11, 2016

(30) Foreign Application Priority Data

Aug. 11, 2014   (KR) ........................ 10-2014-0103644

(51) Int. Cl.
| | |
|---|---|
| G02B 13/18 | (2006.01) |
| G02B 9/60 | (2006.01) |
| G02B 13/00 | (2006.01) |
| H04N 5/372 | (2011.01) |
| H04N 5/374 | (2011.01) |
| H04N 5/235 | (2006.01) |
| H04N 5/225 | (2006.01) |

(52) U.S. Cl.
CPC .......... *G02B 13/0045* (2013.01); *H04N 5/2254* (2013.01); *H04N 5/2352* (2013.01); *H04N 5/372* (2013.01); *H04N 5/374* (2013.01)

(58) Field of Classification Search
CPC ....... G02B 13/0045; G02B 6/60; G02B 13/18
USPC ................... 359/713, 714, 763, 764
See application file for complete search history.

(56) References Cited

U.S. PATENT DOCUMENTS

| | | | |
|---|---|---|---|
| 2013/0182336 A1* | 7/2013 | Hsu | G02B 13/0045 359/714 |
| 2013/0329307 A1 | 12/2013 | Jung et al. | |
| 2013/0342919 A1* | 12/2013 | Tang | G02B 13/0045 359/714 |
| 2014/0002909 A1 | 1/2014 | Yonezawa | |
| 2014/0049839 A1 | 2/2014 | Shinohara | |

FOREIGN PATENT DOCUMENTS

| | | |
|---|---|---|
| JP | 2010048996 A | 3/2010 |
| JP | 2013257527 A | 12/2013 |
| JP | 2014010331 A | 1/2014 |
| WO | 2013014850 A1 | 1/2013 |

\* cited by examiner

*Primary Examiner* — Scott J Sugarman
(74) *Attorney, Agent, or Firm* — St. Onge Steward Johnston & Reens, LLC (57) ABSTRACT

A photographic lens optical system having low manufacturing costs and high performance. A lens optical system includes first through fifth lenses, which are sequentially arranged along a light proceeding path between an object and an image sensor where an image of the object is formed, wherein the first lens has positive refractive power and an incident surface convex towards the object, the second lens has negative refractive power and an emitting surface concave with respect to the image sensor, a third lens has positive refractive power and is a meniscus lens convex towards the image sensor, the fourth lens has negative refractive power and is a meniscus lens convex towards the image sensor, and the fifth lens has negative refractive power, wherein at least one of an incident surface and an emitting surface of the fifth lens is aspheric.

16 Claims, 8 Drawing Sheets

PHOTOGRAPHIC LENS OPTICAL SYSTEM

FIELD OF THE INVENTION

One or more exemplary embodiments relate to an optical apparatus, and more particularly, to a lens optical system applied to a camera.

BACKGROUND OF THE INVENTION

Supply of cameras using a solid image pickup device, such as a charge coupled device (CCD) or a complementary metal oxide semiconductor (CMOS) image sensor, has been generalized.

According to an increase in a degree of pixel integration of the solid image pickup device, resolution is being rapidly increased, and at the same time, performance of a lens optical system is being largely improved, and thus the cameras have high performance, are small in size, and are lightweight.

According to a lens optical system of a general miniature camera, such as a mobile phone camera, at least one glass lens is included in an optical system including a plurality of lenses so as to secure performance. However, the glass lens not only has a high manufacturing unit price, but also hinders miniaturization of the lens optical system due to restrictions on molding and processes.

Accordingly, a lens optical system that is small in size, lightweight, and may achieve high performance and high resolution while resolving problems generated by using a glass lens has been developed.

SUMMARY OF THE INVENTION

One or more exemplary embodiments include a lens optical system that has low manufacturing expenses, is easily miniaturized, and is light-weighted.

One or more exemplary embodiments include a high performance lens optical system that is suitable to a high resolution camera.

Additional aspects will be set forth in part in the description which follows and, in part, will be apparent from the description, or may be learned by practice of the presented embodiments.

According to one or more exemplary embodiments, a lens optical system includes first through fifth lenses, which are sequentially arranged along a light proceeding path between an object and an image sensor where an image of the object is formed, wherein the first lens has positive refractive power and an incident surface convex towards the object, the second lens has negative refractive power and an emitting surface concave with respect to the image sensor, a third lens has positive refractive power and is a meniscus lens convex towards the image sensor, the fourth lens has negative refractive power and is a meniscus lens convex towards the image sensor, the fifth lens has negative refractive power, wherein at least one of an incident surface and an emitting surface of the fifth lens is aspheric, and the lens optical system satisfies at least one of Conditions 1 through 3 below:

$(V3+V4)/2>50$,  <Condition 1> wherein V3 denotes an Abbe's number of the third lens and V4 denotes an Abbe's number of the fourth lens;

$30°<CRA\ 1.0Y<33°$,  <Condition 2> wherein CRA 1.0Y denotes a chief ray angle of light incident on a Y-axis 1.0 field with respect to the image sensor; and $1.5<Nd4<1.6$,  <Condition 3> wherein Nd4 denotes a refractive index of the fourth lens.

The first lens may be a biconvex lens.

An incident surface of the second lens may be convex towards the object.

At least one of the first through fourth lenses may be an aspheric lens.

At least one of an incident surface and an emitting surface of at least one of the first through fourth lenses may be aspheric.

At least one of the incident surface and the emitting surface of the fifth lens may have at least one inflection point from a center portion to an edge.

The incident surface of the fifth lens may have at least three inflection points from a center portion to an edge.

The center portion of the incident surface of the fifth lens may be convex towards the subject, and be concave and then convex towards the edge.

The center portion of the incident surface of the fifth lens may be convex towards the object, and be concave, convex, and then concave towards the edge.

The second through fifth lenses may each be an aberration correction lens.

An aperture may be further provided between the object and the image sensor.

The aperture may be provided between first and second lenses.

An infrared blocking unit may be further provided between the object and the image sensor.

The infrared blocking unit may be provided between the fifth lens and the image sensor.

At least one of the first through fifth lenses may be a plastic lens.

According to one or more exemplary embodiments, a lens optical system includes first through fifth lenses, which are sequentially arranged from an object, between the object and an image sensor where an image of the object is formed, wherein the first through fifth lenses respectively have positive, negative, positive, negative, and negative refractive powers, and the lens optical system satisfies at least one of Conditions 1 and 2 below:

$(V3+V4)/2>50$,  <Condition 1> wherein V3 denotes an Abbe's number of the third lens and V4 denotes an Abbe's number of the fourth lens; and $30°<CRA\ 1.0Y<33°$,  <Condition 2> wherein CRA 1.0Y denotes a chief ray angle of light incident on an Y-axis 1.0 field with respect to the image sensor.

The lens optical system may further satisfy Condition 3 below:

$1.5<Nd4<1.6$,  <Condition 3> wherein Nd4 denotes a refractive index of the fourth lens.

The first lens may be a biconvex lens, the second lens may be concave with respect to the image sensor, the third lens may be a meniscus lens convex towards the image sensor, the fourth lens may be a meniscus lens convex towards the image sensor, and the fifth lens may be an aspheric lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Reference will now be made in detail to embodiments, examples of which are illustrated in the accompanying drawings, wherein like reference numerals refer to like elements throughout.

FIGS. 1 through 4 are cross-sectional views showing an arrangement of main components of a lens optical system, according to exemplary embodiments.

Referring to FIGS. 1 through 4, the lens optical system according to exemplary embodiments includes first through fifth lenses I through V, which are sequentially arranged from an object OBJ, between the object OBJ and an image sensor IMG where an image of the object OBJ is formed. The first lens I may have positive (+) refractive power and be convex towards the object OBJ. An incident surface 1* of the first lens I may be convex towards the object OBJ and an emitting surface 2* of the first lens I may be convex towards the image sensor IMG. Accordingly, the first lens I may be a lens in which both surfaces (i.e., the incident surface 1* and the emitting surface 2*) are convex, i.e., may be a biconvex lens.

The second lens II may have negative (−) refractive power and may be concave with respect to the image sensor IMG. An emitting surface 5* of the second lens II may be concave with respect to the image sensor IMG. An incident surface 4* of the second lens II may be convex towards the object OBJ. Accordingly, the second lens II may be a meniscus lens convex towards the object OBJ.

The third lens III may have positive (+) refractive power and may be a meniscus lens convex towards the image sensor IMG. Accordingly, both an incident surface 6* and an emitting surface 7* of the third lens III may be convex towards the image sensor IMG.

The fourth lens IV may have negative (−) refractive power and may be a meniscus lens convex towards the image sensor IMG. Accordingly, both surfaces, i.e., an incident surface 8* and an emitting surface 9*, of the fourth lens IV may be convex towards the image sensor IMG. At least one of the first through fourth lenses I through IV may be an aspheric lens. In other words, at least one of the incident surface 1*, 4*, 6*, or 8* and the emitting surface 2*, 5*, 7*, or 9* of at least one of the first through fourth lenses I through IV may be aspheric. For example, the incident surface 1*, 4*, 6*, or 8* and the emitting surface 2*, 5*, 7*, or 9* of each of the first through fourth lenses I through IV may both be aspheric.

The fifth lens V may have negative (−) refractive power, and at least one of an incident surface 10* and an emitting surface 11* of the fifth lens V may be aspheric. For example, at least one of the incident surface 10* and the emitting surface 11* may be aspheric while having at least one inflection point from a center portion to an edge.

The incident surface 10* of the fifth lens V may have at least two inflection points from the center portion to the edge. In other words, the incident surface 10* may have two inflection points from the center portion to the edge within an effective lens region (i.e., an effective diameter region) of the fifth lens V.

Throughout the fifth lens V, the incident surface 10* of the fifth lens V may have three inflection points from the center portion to the edge. Within the effective diameter region of the fifth lens V, the center portion of the incident surface 10* may be convex towards the object OBJ, and may be concave and then convex towards the edge. Alternatively, throughout the fifth lens V, the center portion of the incident surface 10* may be convex towards the object OBJ, and concave, convex, and then concave towards the edge.

The emitting surface 11* of the fifth lens V may have one inflection point from the center portion to the edge. Accordingly, the center portion of the emitting surface 11* may be concave towards the image sensor IMG and convex towards the edge. The first lens I may have strong positive refractive power and the second through fifth lenses II through V may operate as an aberration correction lens.

An aperture S3 and an infrared blocking unit VI may be further provided between the object OBJ and the image sensor IMG. The aperture S3 may be provided between the first lens I and the second lens II. In other words, the aperture S3 may be disposed adjacent to the emitting surface 2* of the first lens I.

The infrared blocking unit VI may be provided between the fifth lens V and the image sensor IMG. The infrared blocking unit VI may be an infrared blocking filter. Locations of the aperture S3 and the infrared blocking unit VI may vary.

In FIGS. 1 through 4, a total track length (TTL) denotes a distance from the incident surface 1* of the first lens I to the image sensor IMG, i.e., a total length of the lens optical system, a back focal length (BFL) denotes a distance from a center of the emitting surface 11* of the fifth lens V to the image sensor IMG.

The lens optical system described above according to the exemplary embodiments may satisfy at least one of Conditions 1 through 3 below.

$$(V3+V4)/2>50 \qquad \text{<Condition 1>}$$

Here, V3 denotes an Abbe's number of a third lens and V4 denotes an Abbe's number of a fourth lens.

The Abbe's numbers of the third and fourth lenses may be limited as in Condition 1 when the third and fourth lenses are plastic lenses. Accordingly, manufacturing unit prices of the third and fourth lenses may be reduced, and by setting an Abbe's number to be at least 50, a chromatic aberration may be corrected.

$$30°<CRA\ 1.0Y<33° \qquad \text{<Condition 2>}$$

Here, CRA 1.0Y denotes a chief ray angle of light incident on a Y-axis 1.0 field with respect to an image sensor.

Condition 2 limits 1.0F (field) CRA as above. Accordingly, an optical system satisfying conditions of a wide angle while maintaining a suitable level of BFL may be designed.

$$1.5<Nd4<1.6 \qquad \text{<Condition 3>}$$

Here, Nd4 denotes a refractive index of a fourth lens. According to Condition 3, the fourth lens may be formed of plastic having a low refractive material, thereby reducing manufacturing costs of the fourth lens.

According to the lens optical systems (hereinafter, also respectively referred to as EMB1 through EMB4) of FIGS. 1 through 4, Table 1 shows values of Conditions 1 through 3.

TABLE 1

|      | V3    | V4    | Condition 1 | Condition 2 | Condition 3 |
|------|-------|-------|-------------|-------------|-------------|
| EMB1 | 55.86 | 55.86 | 55.86       | 33.01       | 1.533       |
| EMB2 | 55.86 | 55.86 | 55.86       | 31.33       | 1.533       |
| EMB3 | 55.86 | 55.86 | 55.86       | 31.12       | 1.533       |
| EMB4 | 55.86 | 55.86 | 55.86       | 31.23       | 1.533       |

As shown in Table 1, EMB1 through EMB4 all satisfy Conditions 1 through 3.

In the lens optical system having the above structure according to the exemplary embodiments, the first through fifth lenses I through V may be formed of plastic considering their shapes and dimensions. In other words, the first through fifth lenses I through V may all be a plastic lens. If a glass lens is used, a lens optical system not only has high manufacturing unit costs, but also is difficult to miniaturize due to restrictions on molding and processes. However, since the first through fifth lenses I through V may be formed of plastic, manufacturing unit costs may be decreased and a lens optical system may be miniaturized. However, a material of the first through fifth lenses I through V is not limited to plastic. As occasion demands, at least one of the first through fifth lens I through V may be formed of glass.

EMB1 through EMB3 will now be described in detail with reference to lens data and attached drawings.

Tables 2 through 5 below show a curvature radius, a lens thickness or a distance between lenses, a refractive index, and an Abbe's number of each lens forming the lens optical systems of FIGS. 1 through 4. In Tables 2 through 5, R denotes a curvature radius, D denotes a lens thickness, a lens interval, or an interval between adjacent components, Nd denotes a refractive index of a lens measured by using a d-line, and Vd denotes an Abbe's number of a lens with respect to the d-line. A mark "*" besides a lens surface number denotes that a lens surface is aspheric. Also, a unit of values of R and D is mm.

TABLE 2

| EMB1 | S    | R        | D      | Nd    | Vd     |
|------|------|----------|--------|-------|--------|
| I    | 1*   | 1.6038   | 0.6224 | 1.533 | 55.856 |
|      | 2*   | -40.8339 | 0.0000 |       |        |
|      | S3   | Infinity | 0.0400 |       |        |
| II   | 4*   | 14.8692  | 0.2821 | 1.647 | 22.434 |
|      | 5*   | 2.9395   | 0.5037 |       |        |
| III  | 6*   | -7.9943  | 0.4000 | 1.533 | 55.856 |
|      | 7*   | -3.4379  | 0.2808 |       |        |
| IV   | 8*   | -1.4112  | 0.5807 | 1.533 | 55.856 |
|      | 9*   | -1.6218  | 0.1021 |       |        |
| V    | 10*  | 3.6104   | 1.2435 | 1.533 | 55.856 |
|      | 11*  | 1.8527   | 0.2800 |       |        |
| VI   | 12   | Infinity | 0.2100 |       |        |
|      | 13   | Infinity | 0.8055 |       |        |
|      | IMG  | Infinity |        |       |        |

TABLE 3

| EMB2 | S    | R        | D      | Nd    | Vd     |
|------|------|----------|--------|-------|--------|
| I    | 1*   | 1.6032   | 0.6567 | 1.533 | 55.856 |
|      | 2*   | -17.9479 | 0.0000 |       |        |
|      | S3   | Infinity | 0.0400 |       |        |
| II   | 4*   | 8.8769   | 0.2717 | 1.647 | 22.434 |
|      | 5*   | 2.3939   | 0.4808 |       |        |
| III  | 6*   | -10.3596 | 0.4000 | 1.533 | 55.856 |
|      | 7*   | -4.4300  | 0.3106 |       |        |
| IV   | 8*   | -1.3416  | 0.4988 | 1.533 | 55.856 |
|      | 9*   | -1.5226  | 0.1000 |       |        |
| V    | 10*  | 3.4430   | 1.3010 | 1.533 | 55.856 |

TABLE 3-continued

| EMB2 | S    | R        | D      | Nd | Vd |
|------|------|----------|--------|----|----|
|      | 11*  | 2.0226   | 0.2800 |    |    |
| VI   | 12   | Infinity | 0.2100 |    |    |
|      | 13   | Infinity | 0.8018 |    |    |
|      | IMG  | Infinity |        |    |    |

TABLE 4

| EMB3 | S    | R        | D      | Nd    | Vd     |
|------|------|----------|--------|-------|--------|
| I    | 1*   | 1.6073   | 0.6583 | 1.533 | 55.856 |
|      | 2*   | -17.3160 | 0.0000 |       |        |
|      | S3   | Infinity | 0.0400 |       |        |
| II   | 4*   | 7.5750   | 0.2718 | 1.647 | 22.434 |
|      | 5*   | 2.2322   | 0.4605 |       |        |
| III  | 6*   | -9.6718  | 0.4000 | 1.533 | 55.856 |
|      | 7*   | -4.0986  | 0.3232 |       |        |
| IV   | 8*   | -1.3520  | 0.4777 | 1.533 | 55.856 |
|      | 9*   | -1.5259  | 0.1230 |       |        |
| V    | 10*  | 3.5696   | 1.2155 | 1.533 | 55.856 |
|      | 11*  | 1.9920   | 0.2800 |       |        |
| VI   | 12   | Infinity | 0.2100 |       |        |
|      | 13   | Infinity | 0.8028 |       |        |
|      | IMG  | Infinity |        |       |        |

TABLE 5

| EMB4 | S    | R        | D      | Nd    | Vd     |
|------|------|----------|--------|-------|--------|
| I    | 1*   | 1.5929   | 0.6560 | 1.533 | 55.856 |
|      | 2*   | -15.5051 | 0.0000 |       |        |
|      | S3   | Infinity | 0.0400 |       |        |
| II   | 4*   | 6.6937   | 0.2654 | 1.647 | 22.434 |
|      | 5*   | 2.0963   | 0.4286 |       |        |
| III  | 6*   | -10.4556 | 0.400  | 1.533 | 55.856 |
|      | 7*   | -4.1478  | 0.3547 |       |        |
| IV   | 8*   | -1.3399  | 0.4593 | 1.533 | 55.856 |
|      | 9*   | -1.5073  | 0.1000 |       |        |
| V    | 10*  | 3.4958   | 1.1661 | 1.533 | 55.856 |
|      | 11*  | 1.9519   | 0.2800 |       |        |
| VI   | 12   | Infinity | 0.2100 |       |        |
|      | 13   | Infinity | 0.8043 |       |        |
|      | IMG  | Infinity |        |       |        |

An aspheric surface of each lens in the lens optical systems of FIGS. 1 through 4 satisfies Condition 4 below.

$$x = \frac{c'y^2}{1+\sqrt{1-(K+1)c'^2 y^2}} + Ay^4 + By^6 + Cy^8 + Dy^{10} + Ey^{12}$$ [Condition 4]

Here, x denotes a distance from an apex of a lens in an optical axis direction, y denotes a distance in a perpendicular direction as an optical axis, c' denotes an inverse of a paraxial curvature radius (1/r) at an apex of a lens, K denotes a conic constant, and A through E each denote an aspheric coefficient.

Tables 6 through 9 below show aspheric coefficients of aspheric surfaces respectively in the lens optical systems of FIGS. 1 through 4. In other words, Tables 6 through 9 show aspheric coefficients of the incident surfaces 1*, 4*, 6*, 8*, and 10* and the emitting surfaces 2*, 5*, 7*, 9*, and 11* of Tables 2 through 5.

TABLE 6

| S | K | A | B | C | D | E |
|---|---|---|---|---|---|---|
| 1* | −0.1757 | 0.0030 | −0.0011 | −0.0268 | 0.0276 | −0.0273 |
| 2* | 0.0000 | −0.0273 | 0.0438 | −0.0454 | −0.0189 | 0.0184 |
| 4* | 0.0000 | −0.0118 | 0.0793 | −0.0363 | 0.0163 | 0.0039 |
| 5* | 2.8829 | 0.0005 | 0.0655 | −0.0049 | 0.0121 | 0.0348 |
| 6* | 0.0000 | −0.1068 | −0.0205 | −0.0029 | 0.0199 | 0.0323 |
| 7* | 0.0000 | −0.0413 | −0.0450 | 0.0233 | 0.0024 | 0.0067 |
| 8* | −6.3514 | −0.00395 | 0.0105 | −0.0209 | 0.0060 | 0.0005 |
| 9* | −1.3766 | 0.0109 | −0.0088 | 0.0094 | −0.0037 | 0.0002 |
| 10* | −31.8401 | −0.0981 | 0.0218 | −0.0008 | −0.0000 | −0.0000 |
| 11* | −6.1129 | −0.0448 | 0.0123 | −0.0028 | 0.0003 | −0.0000 |

TABLE 7

| S | K | A | B | C | D | E |
|---|---|---|---|---|---|---|
| 1* | −0.1907 | 0.0026 | −0.0035 | −0.0284 | 0.0361 | −0.0297 |
| 2* | 0.0000 | −0.0082 | 0.0392 | −0.0565 | −0.0093 | 0.0119 |
| 4* | 0.0000 | −0.0161 | 0.0942 | −0.0263 | −0.0489 | 0.0414 |
| 5* | 1.2869 | −0.0268 | 0.0957 | −0.0197 | 0.0030 | 0.0348 |
| 6* | 0.0000 | −0.1106 | −0.0095 | −0.0083 | −0.0071 | 0.0514 |
| 7* | 0.0000 | −0.0470 | −0.0503 | 0.0193 | 0.0018 | 0.0069 |
| 8* | −5.7931 | −0.0454 | 0.0021 | −0.0220 | 0.0107 | 0.0037 |
| 9* | −1.3404 | 0.0087 | −0.0085 | 0.0119 | −0.0026 | 0.0003 |
| 10* | −30.7837 | −0.0878 | 0.0227 | −0.0011 | −0.0001 | −0.0000 |
| 11* | −6.6209 | −0.0414 | 0.0110 | −0.0026 | 0.0003 | −0.0000 |

TABLE 8

| S | K | A | B | C | D | E |
|---|---|---|---|---|---|---|
| 1* | −0.2000 | 0.0020 | −0.0030 | −0.0302 | 0.0373 | −0.0295 |
| 2* | 0.0000 | −0.0042 | 0.0383 | −0.0583 | −0.0055 | 0.0103 |
| 4* | 0.0000 | −0.0157 | 0.0963 | −0.0215 | −0.0590 | 0.0466 |
| 5* | 1.1431 | −0.0312 | 0.1045 | −0.0224 | 0.0086 | 0.0348 |
| 6* | 0.0000 | −0.1036 | −0.0073 | −0.0015 | −0.0073 | 0.0607 |
| 7* | 0.0000 | −0.0451 | −0.0499 | 0.0196 | 0.0032 | 0.0099 |
| 8* | −5.7464 | −0.0429 | 0.0001 | −0.0248 | 0.0108 | 0.0047 |
| 9* | −1.7203 | 0.0121 | −0.0102 | 0.0116 | −0.0026 | 0.0003 |
| 10* | −34.2440 | −0.0871 | 0.0228 | −0.0011 | −0.0001 | −0.0000 |
| 11* | −7.2510 | −0.0426 | 0.0111 | −0.0026 | 0.0003 | −0.0000 |

TABLE 9

| S | K | A | B | C | D | E |
|---|---|---|---|---|---|---|
| 1* | −0.2196 | 0.0010 | −0.0027 | −0.0331 | 0.0400 | −0.0309 |
| 2* | 0.0000 | 0.0025 | 0.0342 | −0.0639 | 0.0014 | 0.0008 |
| 4* | 0.0000 | −0.0136 | 0.0985 | −0.0144 | −0.0809 | 0.0599 |
| 5* | 0.9331 | −0.0386 | 0.1216 | −0.0379 | 0.0183 | 0.0348 |
| 6* | 0.0000 | −0.0974 | −0.0081 | 0.0026 | −0.0013 | 0.0658 |
| 7* | 0.0000 | −0.0436 | −0.0522 | 0.0182 | 0.0040 | 0.0143 |
| 8* | −5.9585 | −0.0340 | −0.0070 | −0.0325 | 0.0109 | 0.0072 |
| 9* | −2.5224 | 0.0107 | −0.0138 | 0.0115 | −0.0024 | 0.0003 |
| 10* | −32.9904 | −0.0867 | 0.0231 | −0.0012 | −0.0001 | −0.0000 |
| 11* | −7.8645 | −0.0427 | 0.0108 | −0.0025 | 0.0003 | −0.0000 |

Figure 1:
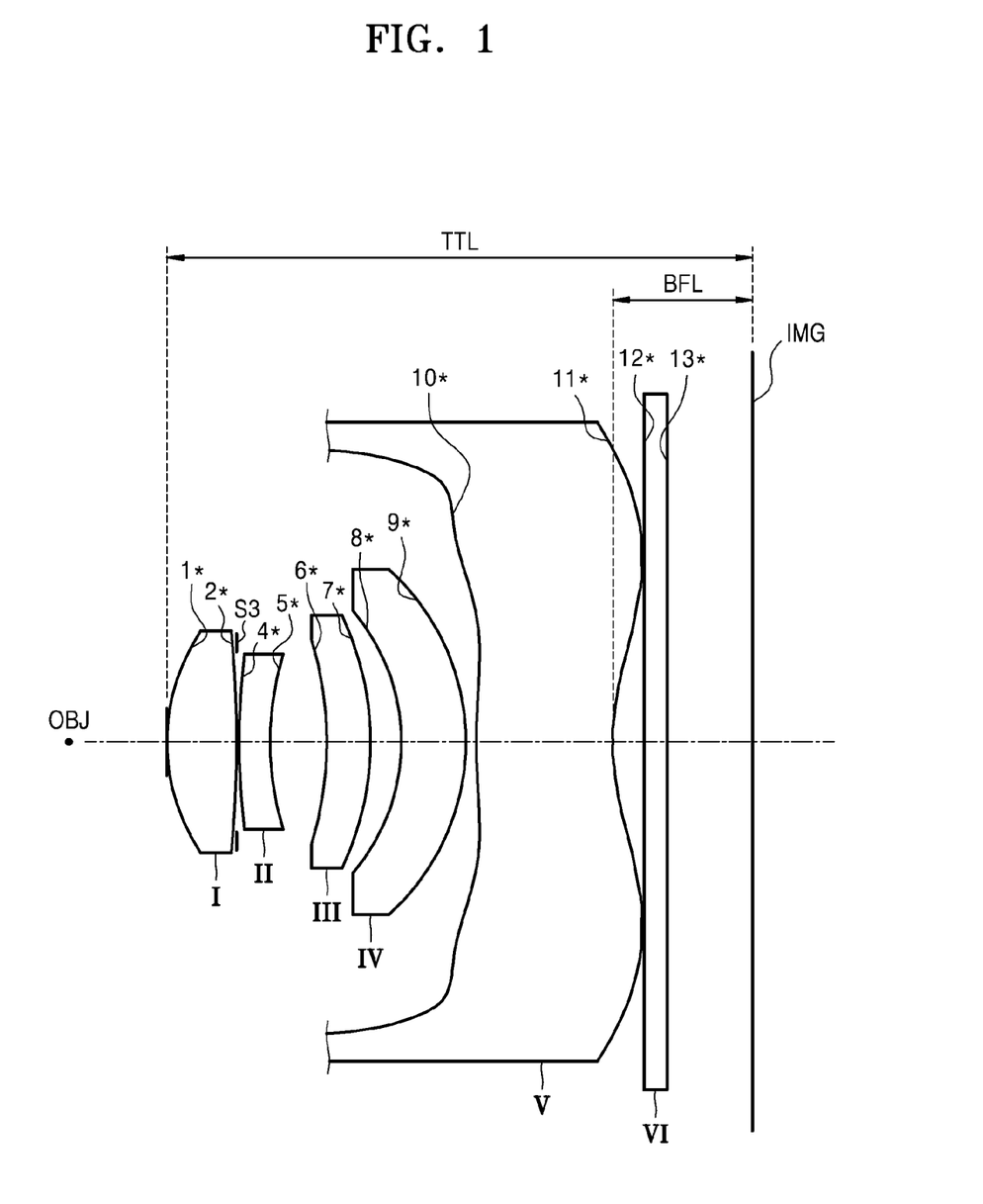
FIGS. 1 through 4 are cross-sectional views showing an arrangements of main components of a lens optical system, according to exemplary embodiments.
Figure 5:
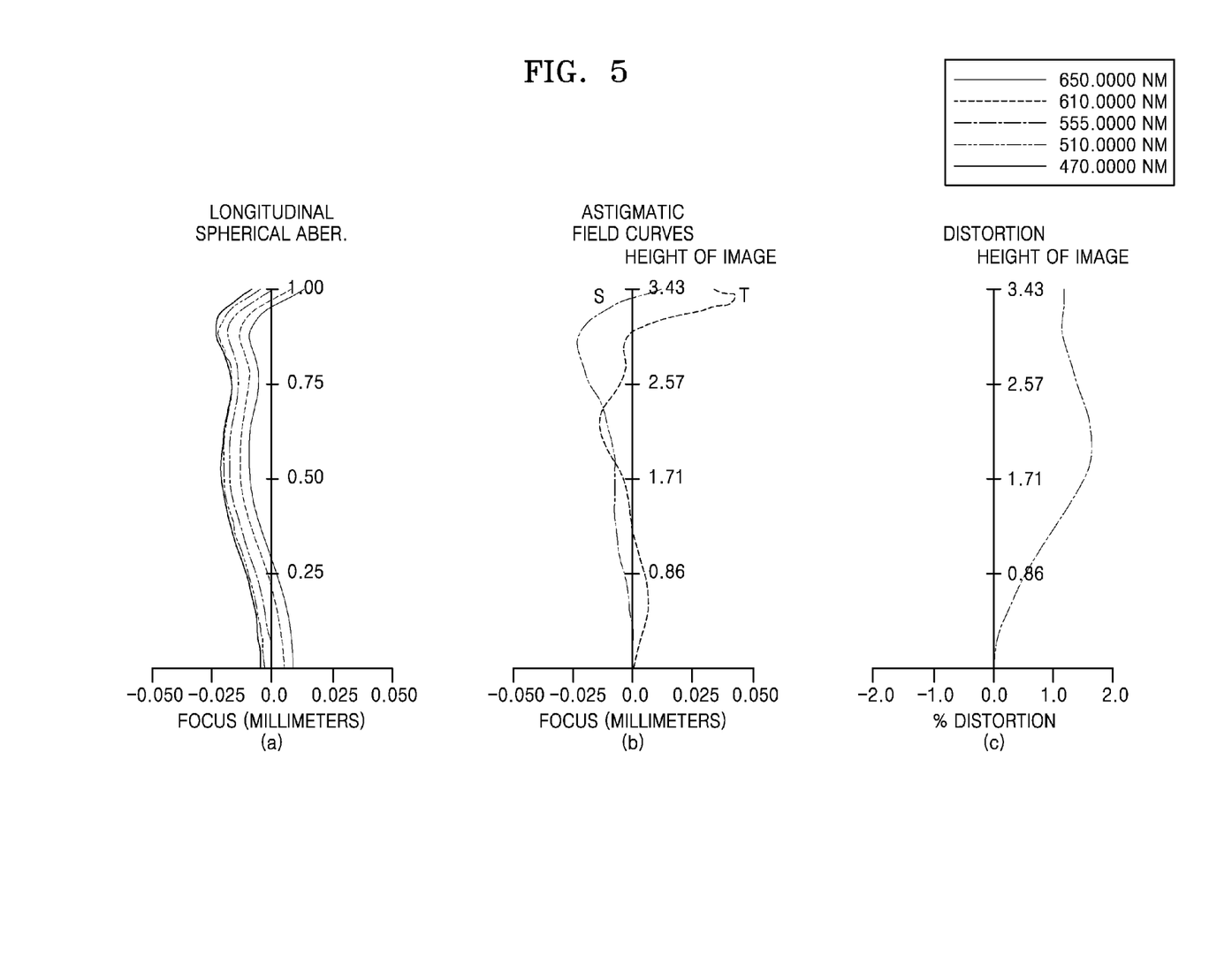
FIG. 5 illustrates longitudinal spherical aberrations, astigmatic field curvatures, and distortion of a lens optical system, according to an exemplary embodiment.

FIG. 5 illustrates longitudinal spherical aberrations, astigmatic field curvatures, and distortion of the lens optical system of FIG. 1 according to Table 2.

FIG. 5 (a) shows the longitudinal spherical aberrations of the lens optical system with respect to light having various wavelengths, FIG. 5 (b) shows the astigmatic field curvatures, i.e., tangential field curvatures T and sagittal field curvatures S. The wavelengths used to obtain the longitudinal spherical aberrations were 656.0000 nm, 610.0000 nm, 555.0000 nm, 510.0000 nm, and 470.0000 nm. The wavelength used to obtain the astigmatic field curvatures and the distortion was 555.1000 nm. The same wavelengths were used in obtaining the values shown in FIGS. 6 and 8.

Figure 2:
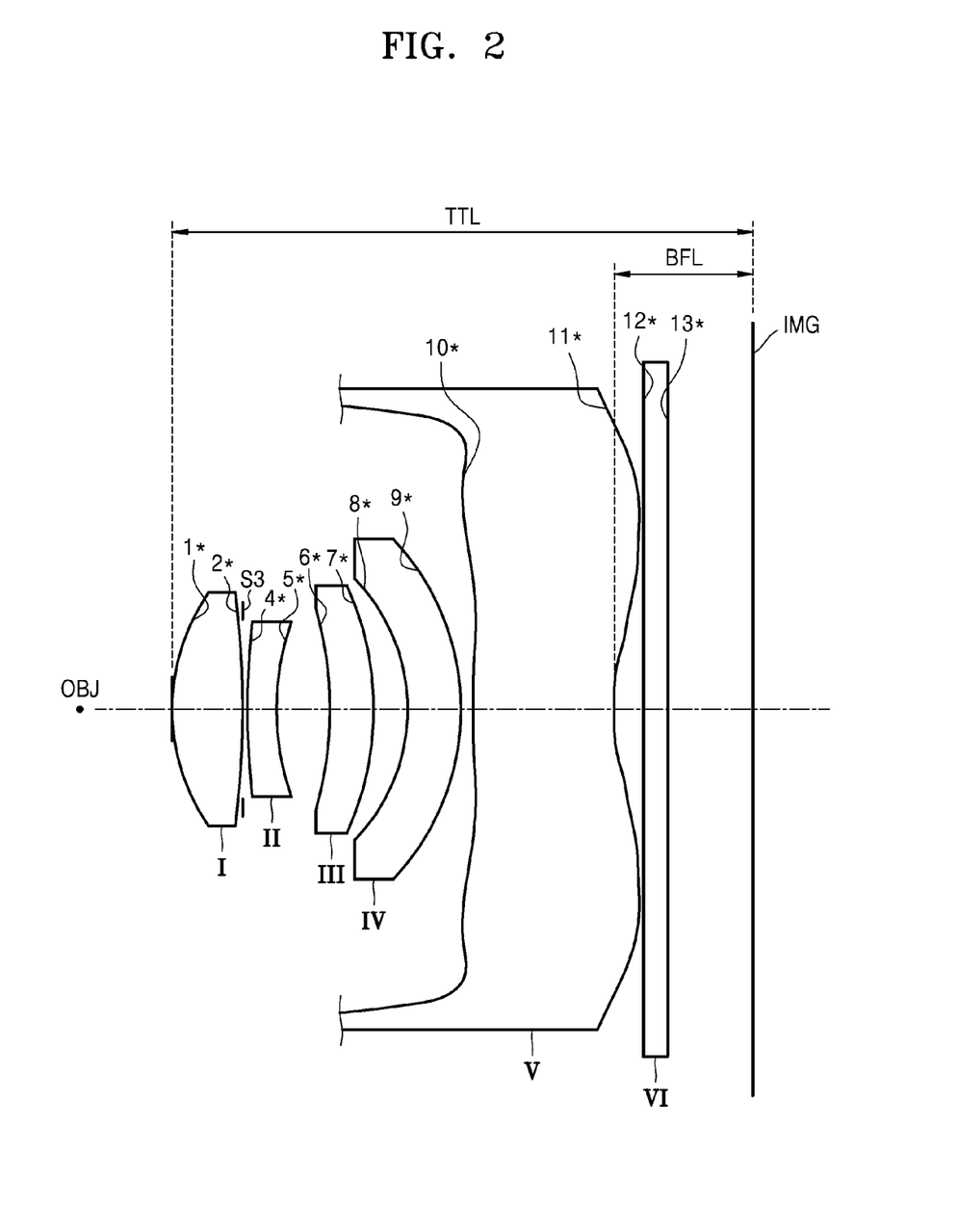
Figure 6:
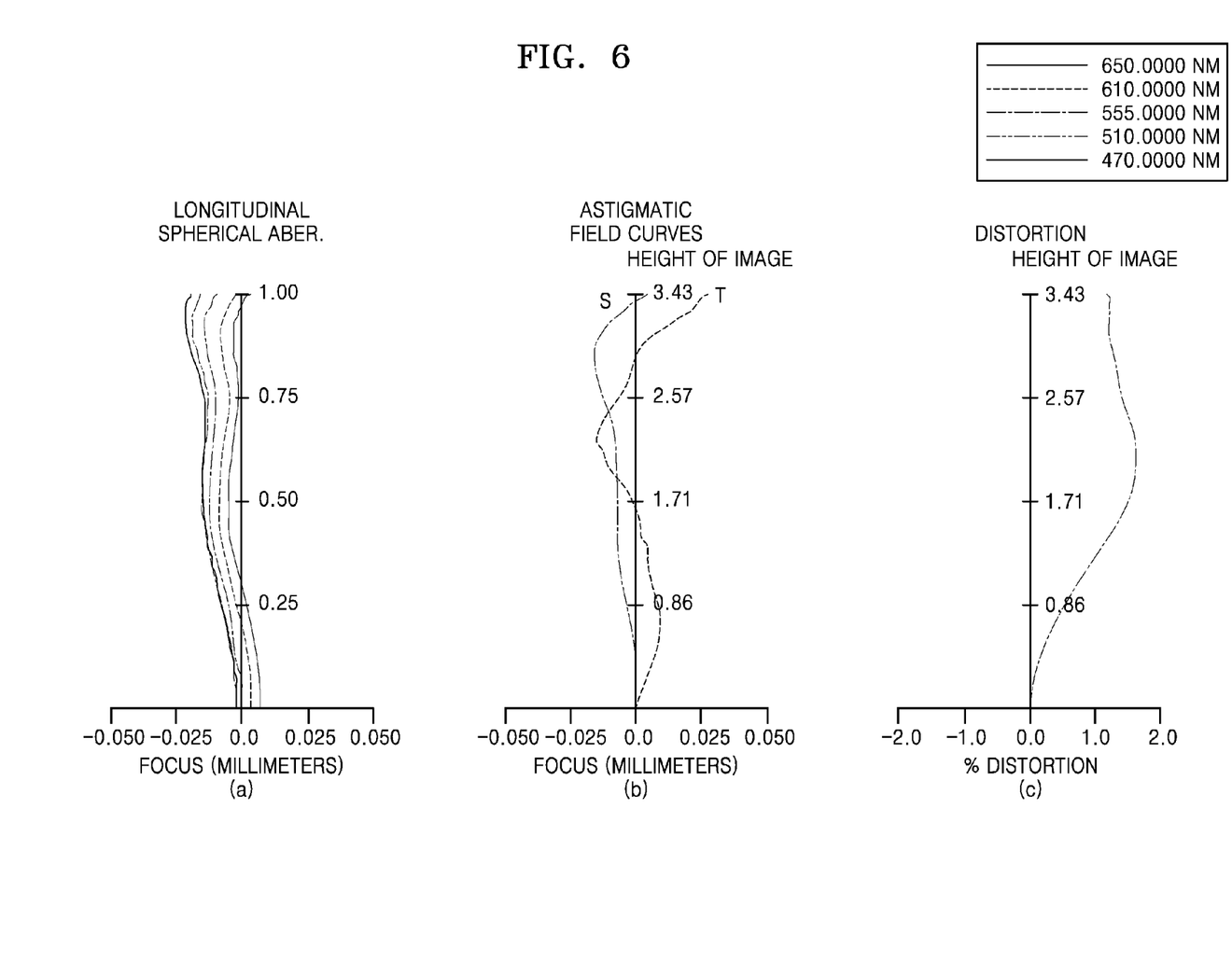
FIG. 6 illustrates longitudinal spherical aberrations, astigmatic field curvatures, and distortion of a lens optical system, according to another exemplary embodiment.

FIG. 6 illustrates longitudinal spherical aberrations, astigmatic field curvatures, and distortion of the lens optical system of FIG. 2 according to Table 3.

Figure 3:
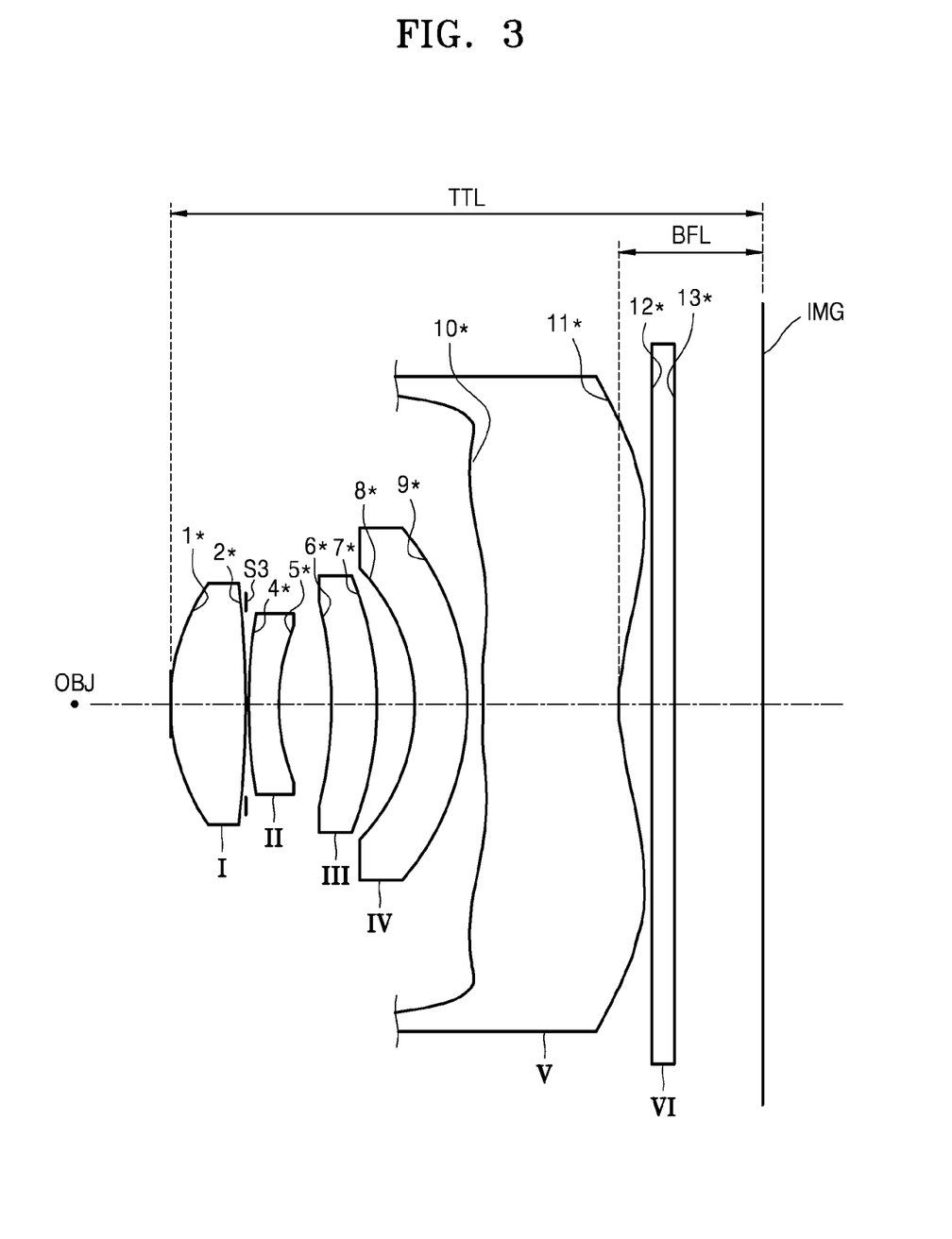
Figure 7:
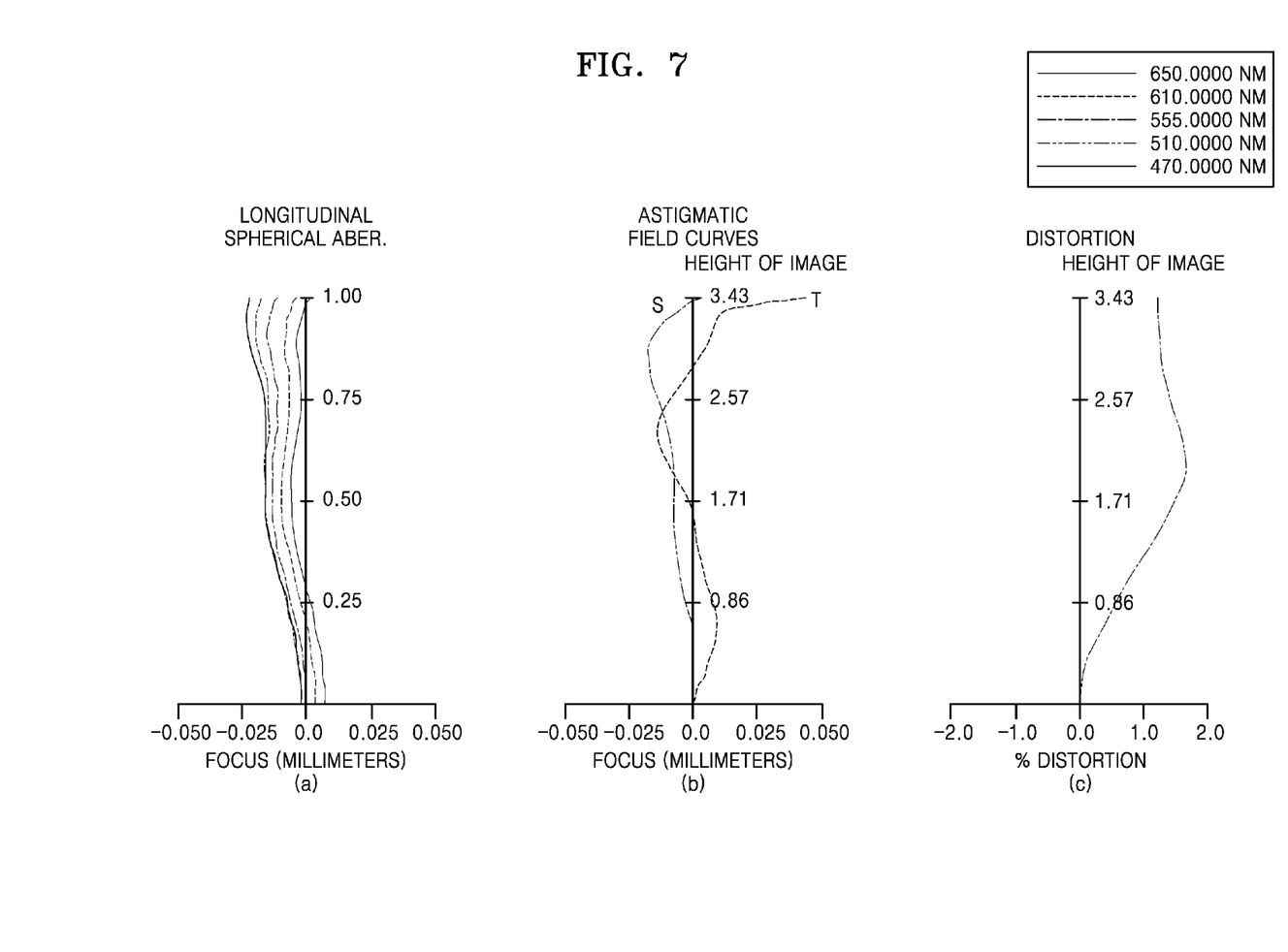
FIG. 7 illustrates longitudinal spherical aberrations, astigmatic field curvatures, and distortion of a lens optical system, according to another exemplary embodiment.

FIG. 7 illustrates longitudinal spherical aberrations, astigmatic field curvatures, and distortion of the lens optical system of FIG. 3 according to Table 4.

Figure 4:
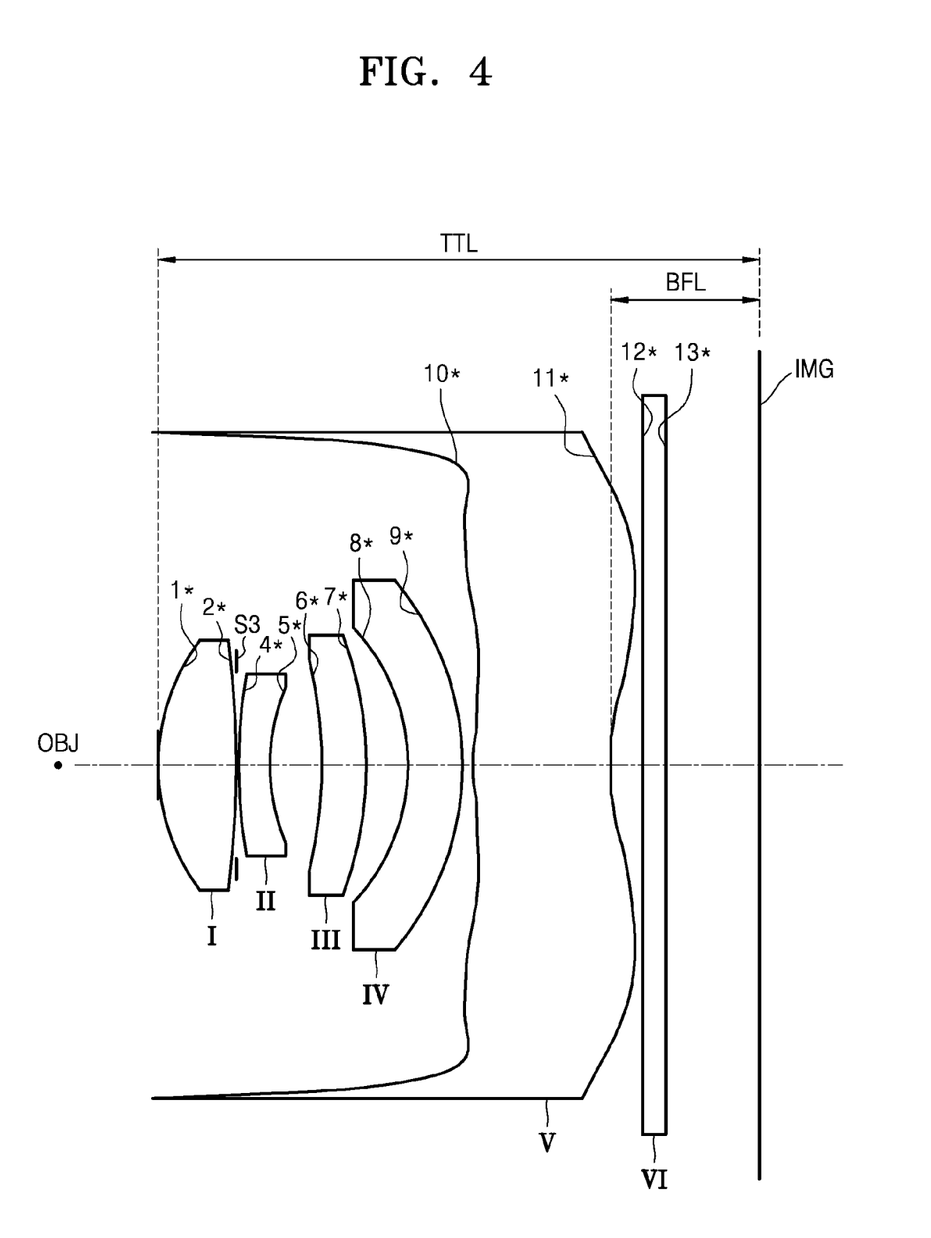
Figure 8:
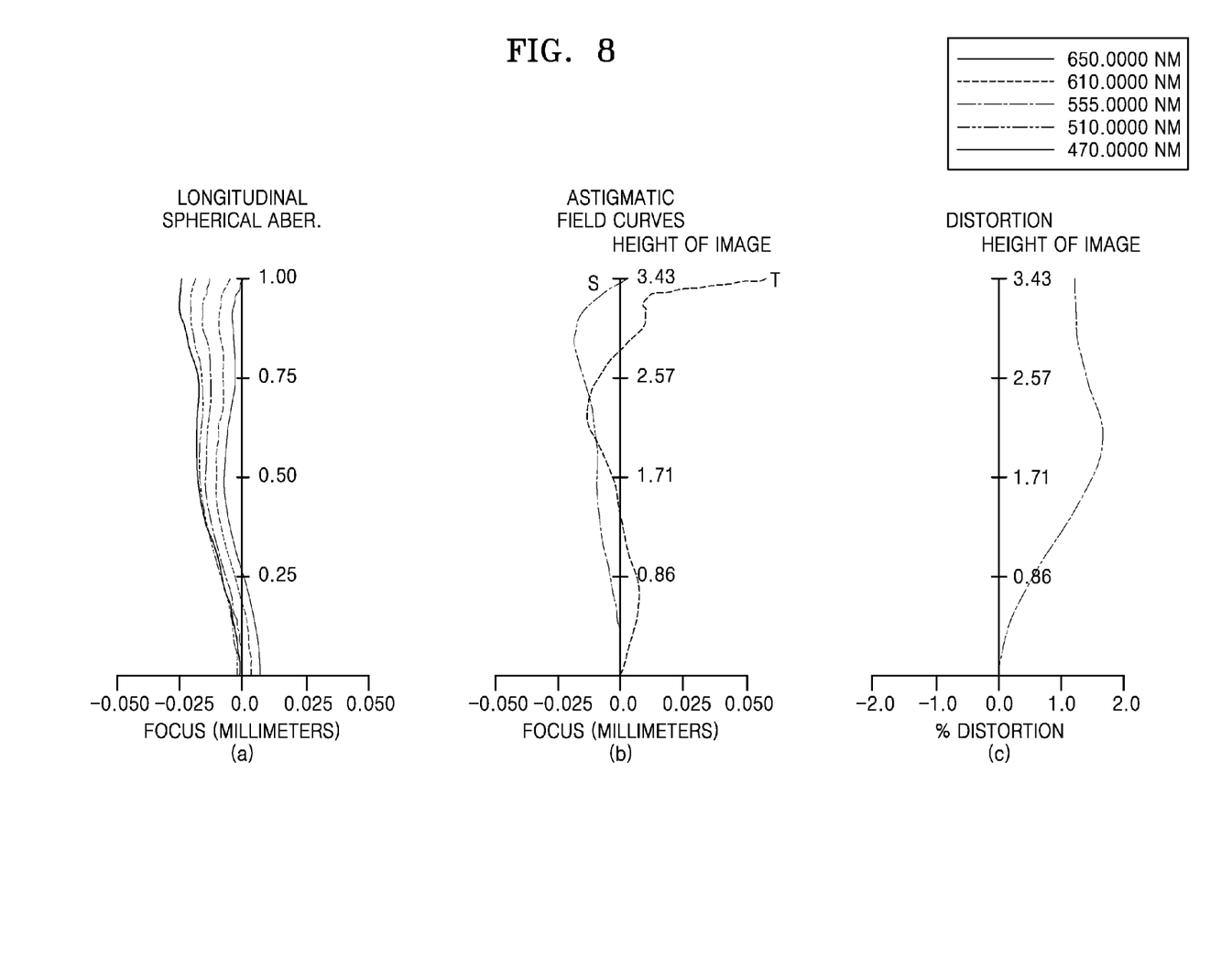
FIG. 8 illustrates longitudinal spherical aberrations, astigmatic field curvatures, and distortion of a lens optical system, according to another exemplary embodiment.

FIG. 8 illustrates longitudinal spherical aberrations, astigmatic field curvatures, and distortion of the lens optical system of FIG. 4 according to Table 5.

As described above, the optical lens systems according to the exemplary embodiments may include the first through fifth lenses I through V, which are sequentially arranged from the object OBJ to the image sensor IMG and respectively have positive, negative, positive, negative, and negative refractive powers, and satisfy at least one of Conditions 1 through 3 above. Such lens optical systems may have a wide viewing angle and a short total length, and may easily compensate for various aberrations. Accordingly, the lens optical system may be small, have a wide viewing angle, and have high performance and high resolution.

In detail, when at least one of the incident surface 10* and the emitting surface 11* of the fifth lens V is an aspheric surface having at least one inflection point from the center portion to the edge, that is, when the incident surface 10* is an aspheric surface having at least two inflection points from the center portion to the edge, the fifth lens V may be used to easily compensate for various aberrations and an emitting angle of a chief ray may be reduced to prevent vignetting.

Also, when the first through fifth lenses I through V are formed of plastic and both surfaces (the incident surfaces 1*, 4*, 6*, 8*, and 10* and the emitting surfaces 2*, 5*, 7*, 9*, and 11*) of the first through fifth lenses I through V are aspheric surfaces, the lens optical systems that are compact and have excellent performance may be manufactured at low cost compared to when a glass lens is used.

It should be understood that exemplary embodiments described herein should be considered in a descriptive sense only and not for purposes of limitation. For example, it would be obvious to one of ordinary skill in the art that a blocking film may be used as a filter instead of the infrared blocking unit VI. While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A lens optical system comprising first through fifth lenses, which are sequentially arranged along a light proceeding path between an object and an image sensor where an image of the object is formed, wherein the first lens has positive refractive power and an incident surface convex towards the object, the second lens has negative refractive power and an emitting surface concave with respect to the image sensor, a third lens has positive refractive power and is a meniscus lens convex towards the image sensor, the fourth lens has negative refractive power and is a meniscus lens convex towards the image sensor, the fifth lens has negative refractive power, wherein at least one of an incident surface and an emitting surface of the fifth lens is aspheric, and the lens optical system satisfies Condition 1 below:

$(V3+V4)/2>50$,            <Condition 1> wherein V3 denotes an Abbe's number of the third lens and V4 denotes an Abbe's number of the fourth lens.

2. The lens optical system of claim 1, satisfying Condition 2 below:

$$30° < CRA\,1.0Y < 33°,\qquad \text{<Condition 2>}$$

wherein CRA 1.0Y denotes a chief ray angle of light incident on a Y-axis 1.0 field with respect to the image sensor.

3. The lens optical system of claim 2, satisfying Condition 3 below:

$$1.5 < Nd4 < 1.6,\qquad \text{<Condition 3>}$$

wherein Nd4 denotes a refractive index of the fourth lens.

4. The lens optical system of claim 1, wherein the first lens is a biconvex lens.

5. The lens optical system of claim 1, wherein an incident surface of the second lens is convex towards the object.

6. The lens optical system of claim 1, wherein at least one of the first through fourth lenses is an aspheric lens.

7. The lens optical system of claim 1, wherein at least one of the incident surface and the emitting surface of the fifth lens has at least one inflection point from a center portion to an edge.

8. The lens optical system of claim 1, wherein the incident surface of the fifth lens has at least two inflection points from a center portion to an edge.

9. The lens optical system of claim 8, wherein the center portion of the incident surface of the fifth lens is convex towards the subject, and is concave and then convex towards the edge.

10. The lens optical system of claim 1, wherein the center portion of the incident surface of the fifth lens is convex towards the object, and is concave, convex, and then concave towards the edge.

11. The lens optical system of claim 1, further comprising an aperture between the first lens and the second lens.

12. The lens optical system of claim 1, further comprising an infrared blocking unit between the fifth lens and the image sensor.

13. The lens optical system of claim 1, wherein at least one of the first through fifth lenses is a plastic lens.

14. A lens optical system comprising first through fifth lenses, which are sequentially arranged from an object, between the object and an image sensor where an image of the object is formed,
wherein the first through fifth lenses respectively have positive, negative, positive, negative, and negative refractive powers, and
the lens optical system satisfies at least one of Conditions 1 and 2 below:

$$(V3+V4)/2 > 50,\qquad \text{<Condition 1>}$$

wherein V3 denotes an Abbe's number of the third lens and V4 denotes an Abbe's number of the fourth lens; and $$30° < CRA\,1.0Y < 33°,\qquad \text{<Condition 2>}$$

wherein CRA 1.0Y denotes a chief ray angle of light incident on an Y-axis 1.0 field with respect to the image sensor.

15. The lens optical system of claim 14, further satisfying Condition 3 below:

$$1.5 < Nd4 < 1.6,\qquad \text{<Condition 3>}$$

wherein Nd4 denotes a refractive index of the fourth lens.

16. The lens optical system of claim 15, wherein the first lens is a biconvex lens,
the second lens is concave with respect to the image sensor,
the third lens is a meniscus lens convex towards the image sensor,
the fourth lens is a meniscus lens convex towards the image sensor, and
the fifth lens is an aspheric lens.

* * * * *